United States Patent [19]

Soffel et al.

[11] Patent Number: 5,355,503
[45] Date of Patent: Oct. 11, 1994

[54] EVENT DRIVEN SCANNING OF DATA INPUT EQUIPMENT USING MULTI-INPUT WAKE-UP TECHNIQUES

[75] Inventors: Volker Soffel, Malching; Thomas Rothhaupt, Emmering, both of Fed. Rep. of Germany

[73] Assignee: National Semiconductor Corporation, Santa Clara, Calif.

[21] Appl. No.: 136,475

[22] Filed: Oct. 13, 1993

Related U.S. Application Data

[63] Continuation of Ser. No. 905,495, Jun. 25, 1992, abandoned, which is a continuation of Ser. No. 531,318, May 31, 1990, abandoned.

[51] Int. Cl.$^5$ ............................................. G06F 1/32
[52] U.S. Cl. ................................ 395/750; 395/575; 364/707; 364/273.1; 364/DIG. 1; 364/948.8; 364/DIG. 2
[58] Field of Search ............. 395/750, 575, 550; 371/66; 364/707, 273.1, DIG. 1, 948.8, DIG. 2

[56] References Cited

U.S. PATENT DOCUMENTS

| | | | |
|---|---|---|---|
| 3,941,989 | 3/1976 | McLaughlin et al. | 395/750 |
| 4,316,247 | 2/1982 | Iwamoto | 364/707 |
| 4,317,181 | 2/1982 | Teza et al. | 364/900 |
| 4,365,290 | 12/1982 | Nelms et al. | 364/200 |
| 4,409,665 | 10/1983 | Tubbs | 364/900 |
| 4,570,219 | 2/1986 | Shibukawa et al. | 395/775 |
| 4,703,359 | 10/1987 | Rumbolt et al. | 358/194.1 |
| 4,758,945 | 7/1988 | Remedi | 395/750 |
| 4,825,407 | 4/1989 | Loessel et al. | 395/550 |
| 4,851,987 | 7/1989 | Day | 364/707 |
| 4,907,150 | 3/1990 | Arroyo et al. | 395/575 |
| 4,982,402 | 1/1991 | Beaven et al. | 371/12 |
| 4,999,794 | 3/1991 | Yakushiji | 364/707 |
| 5,034,624 | 7/1991 | Flaherty et al. | 364/486 |
| 5,083,266 | 1/1992 | Watanabe | 395/275 |
| 5,203,003 | 4/1993 | Donner | 395/800 |
| 5,218,704 | 6/1993 | Watts, Jr. et al. | 395/750 |

FOREIGN PATENT DOCUMENTS

0134966  3/1985  European Pat. Off. ........ G06F 1/32

OTHER PUBLICATIONS

Patent Abstracts of Japan; vol. 11, No. 243, (p-603) (2690) Aug. 8, 1987, & JP-A-62 052 625; (Toshiba) Mar. 7, 1987 abstract.

Primary Examiner—Allen R. MacDonald
Assistant Examiner—Glenn A. Auve
Attorney, Agent, or Firm—Limbach & Limbach

[57] ABSTRACT

An event driven wake-up system for controlling current consumption by a microcontroller that controls a data input device used to enter data to a data processing system is provided. The wake-up system include a data input device, such as a keyboard, that is responsive to an external event, such as depression of a key on the keyboard, by providing a signal indicative of the occurrence of the external event. The microcontroller responds to the external event by generating a data character that corresponds to the signal received from the data input device and provides that data character to the CPU of the data processing system. The microcontroller includes means for sensing inactivity at the data input device and for entering the microcontroller into a reduce current consumption mode when such inactivity is sensed. Wake-up logic responds to an input signal from the data input device and/or from the data processing system when the microcontroller is in the reduced current consumption mode by providing a wake-up signal that removes the microcontroller from the reduced current consumption mode.

9 Claims, 4 Drawing Sheets

EVENT DRIVEN SCANNING OF DATA INPUT EQUIPMENT USING MULTI-INPUT WAKE-UP TECHNIQUES

This is a continuation of co-pending application Ser. No. 07/905,495, filed Jun. 25, 1992, now abandoned which in turn is a file-wrapper-continuation of application Ser. No. 07/531,318, filed on May 31, 1990, now abandoned.

BACKGROUND OF THE INVENTION

1. Field of the Invention

The present invention relates to data input equipment for entering data to a data processing system and, in particular, to an event driven wake-up system for minimizing current consumption by a microcontroller that controls the data input equipment.

2. Discussion of the Prior Art

The most common data input device for a data processing system is a keyboard.

In its basic form, a keyboard consists of a matrix of push-button key switches. Key switch closure is detected by continuously scanning the matrix. According to the scanning technique, each key is identified as an X-Y coordinate, as shown in FIG. 1. To enable keyboard scanning, the keyboard matrix provides a series of X output lines ($X_1$, $X_2$, $X_3$ in FIG. 1) and has a set of Y input lines ($Y_1$, $Y_2$, ... $Y_{10}$ in FIG. 1). These output and input lines are scanned by sequentially providing a logic 0 to each of the X outputs and looking for it on each Y input. An X counter maintains the identity of the X line to which the logic 0 is provided. A Y counter maintains the identity of the Y line being monitored. When a particular Y input is found to have a logic 0 present, the state of the X and Y counters is also examined. For example, a logic 0 on input $Y_4$ when output $X_2$ is also low indicates that the "F" key is depressed.

Since the overhead required to scan the keyboard would place an unnecessary time burden on the data processing system's central processing unit (CPU), time which can be better spent performing more complex tasks, a microcontroller device is typically used to scan the keyboard, map the Y input received from the keyboard matrix to a corresponding keycode data character, and present the CPU with the data characters entered from the keyboard.

The microcontroller sends clock pulses to the keyboard matrix X outputs and, after each pulse, reads the Y inputs to determine whether a key switch in the currently pulsed X row of the keyboard matrix is depressed. A look-up table is used to map to the corresponding keycode based on the X and Y counter values when a logic 0 is read on a Y input.

Conventional computer keyboards use continuous scanning techniques to detect a pressed or released key. Scanning continues even when the keyboard is inactive. This results in very high current consumption by the microcontroller. In some data processing systems that rely on battery power, such as lap top computers, this current consumption can severely limit the use of the system.

SUMMARY OF THE INVENTION

The present invention provides an event driven wake-up system for controlling current consumption by a data input device utilized to enter data to a data processing system. The event driven wake-up system includes a data input device, such as a keyboard, that responds to an external event, such as depression of a key on the keyboard or receipt of data from the data processing system, by providing an active signal indicative of the occurrence of the external event. A microcontroller, which operates in a normal current consumption mode, for example during keyboard scanning, to control the data input device, includes halt circuitry for sensing inactivity at the input device and for causing the microcontroller to enter a reduced current consumption mode when input device inactivity is sensed. Microcontroller wake-up circuitry responds to renewed activity at the data input device by providing a wake-up signal to the microcontroller that removes the microcontroller from the reduced current consumption mode. In the case of a keyboard, the renewed activity includes depression of a key at the keyboard and/or transmission of data to the keyboard from the data processing system.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

Figure 1:
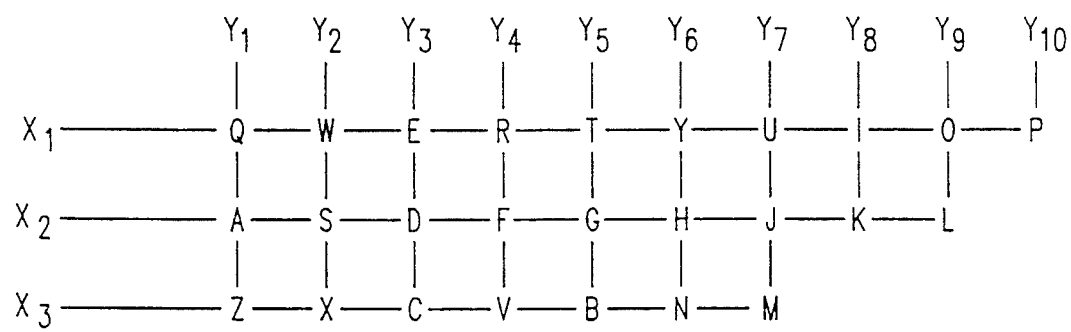
FIG. 1 is a schematic diagram illustrating a conventional keyboard matrix.
Figure 2:
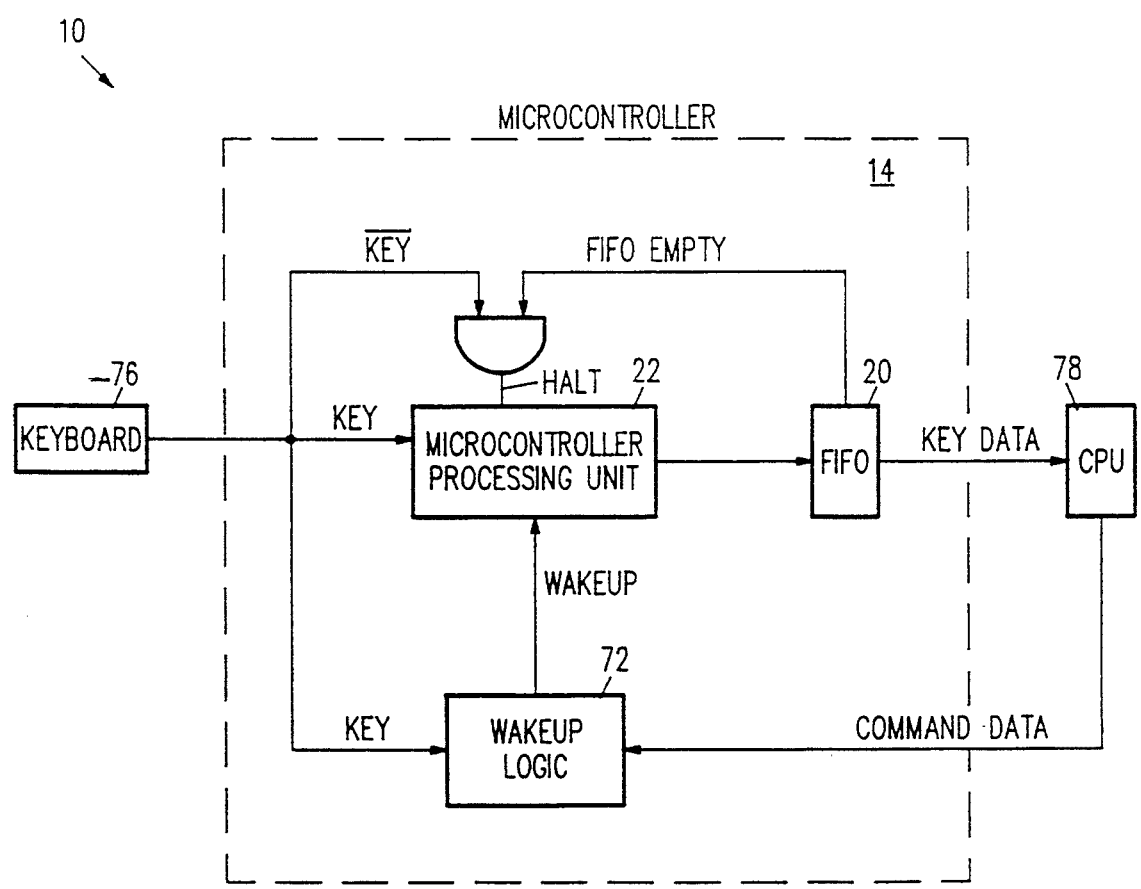
FIG. 2 is a block diagram illustrating an event driven wake-up system in accordance with the present invention.

FIG. 2 shows a simple block diagram of a data processing system 10 that includes event driven wake-up logic 12 for controlling the current consumption by a microcontroller 14. The microcontroller 14 operates in a normal current consumption mode to control the operation of a data input device 16 utilized to enter data to the system 10 for processing by the system's central processing unit 18.

In the FIG. 2 embodiment of the invention, the data input device 16 is illustrated as a keyboard. Those skilled in the art will understand that the data input device 16 can also be a mouse, a digital tablet, a remote control device or any other device responsive to an external event for entering data to the system 10.

When in the normal current consumption mode, the microcontroller 14 scans the keyboard matrix 16, maintains X and Y counter values to identify a depressed key in the matrix 16, maps the identity of a depressed key to a corresponding keycode character, and processes data commands referenced by the CPU 18, all in the conventional manner.

The keycode characters generated by the microcontroller 14 are entered in a multi-byte keycode FIFO (first-in-first-out) buffer 20. The keycode characters are then retrieved sequentially from the keycode FIFO buffer 20 by the CPU 18 in the order in which they were entered.

In accordance with the principles of the present invention, the microcontroller 14 responds to an event that indicates inactivity at keyboard 16 by generating a halt signal. The microcontroller 14 responds to the halt signal by entering a reduced current consumption HALT mode. In the HALT mode, the microcontroller 14 suspends some or all of its operations.

In the FIG. 2 embodiment of the invention, the event that indicates inactivity at the keyboard 16 is the simultaneous assertion by the keycode FIFO buffer 20 of a FIFO empty flag, which indicates that all keycode characters in the FIFO buffer 20 have been transmitted to the CPU 18, and the lack of an active signal KEY from the keyboard 16 indicating activity at the keyboard 16.

When the microcontroller 14 is in the HALT mode, the wake-up logic 12 responds to depression of a key in the keyboard matrix 16 and/or to command data received from the CPU 18 by generating a wake-up signal that reactivates the microcontroller 14, returning the microcontroller 14 to the normal current consumption mode.

Figure 3:
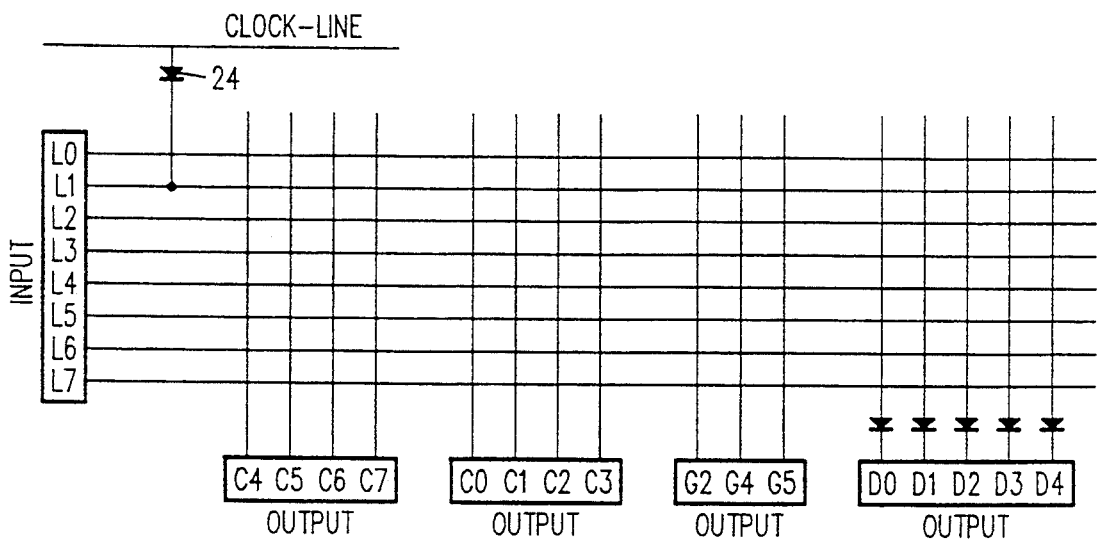
FIG. 3 is a schematic diagram illustrating a keyboard matrix utilizable in an event driven wake-up system in accordance with the present invention.

FIG. 3 shows the keyboard 16 in greater detail. The keyboard 16 is organized as a 16 output by 8 input matrix. The 8-bit (L0–L7) L port of the keyboard 16 is configurable as an input port to the microcontroller 14. Depression of a key on the keyboard 16 or receipt of data from the CPU 18 generates an active signal KEY on one of the L lines (L0–L7) that wakes the microcontroller 14 up from the reduced current consumption HALT mode. Most of the time, the microcontroller 14 will be in the current saving HALT mode (Idd less than 10 uA, if keyboard LED's are off). After returning from the HALT mode, the microcontroller 14 scans the keyboard matrix in the conventional manner to detect which key is pressed and then sends the appropriate keycode data character to the CPU 18 via the keycode FIFO buffer 20. If all keycode data characters in the 16 byte long FIFO buffer 20 have been transmitted and no key in the keyboard matrix 16 is depressed, then the microcontroller 14 returns to the HALT mode.

As shown in FIG. 3, a diode 24 is connected to the L1-line, coupling the CLOCK-LINE to the L1-line. When the CPU 18 wishes to send data to the keyboard 16, it always first pulls the CLOCK-LINE low, the CLOCK-LINE being high when no data is transmitted. This creates a high-to-low transition which is coupled by diode 24 to the L1-line. This active signal KEY is used to wake up the microcontroller 14 from the HALT mode when data is received from the CPU 18. The diode 24 is needed to decouple the keyboard keys in the L1-line from the CLOCK-LINE.

The diodes in the keyboard matrix D line are necessary to prevent high current from being drawn if a key in one of the D lines is depressed. When two keys in the same column are pressed, two outputs are potentially connected together, one of the D line outputs, which could be pulled high, and one of the polled lines, which is pulled low. In this case, without the protection of the diodes, excessive current could be drawn. The diodes can be omitted if the keyboard includes decoupling diodes in its matrix (hardware keyrollover). All other keyboard matrix lines only draw a current in the uA range and, therefore, need no current limiting resistors or diodes.

Figure 4:
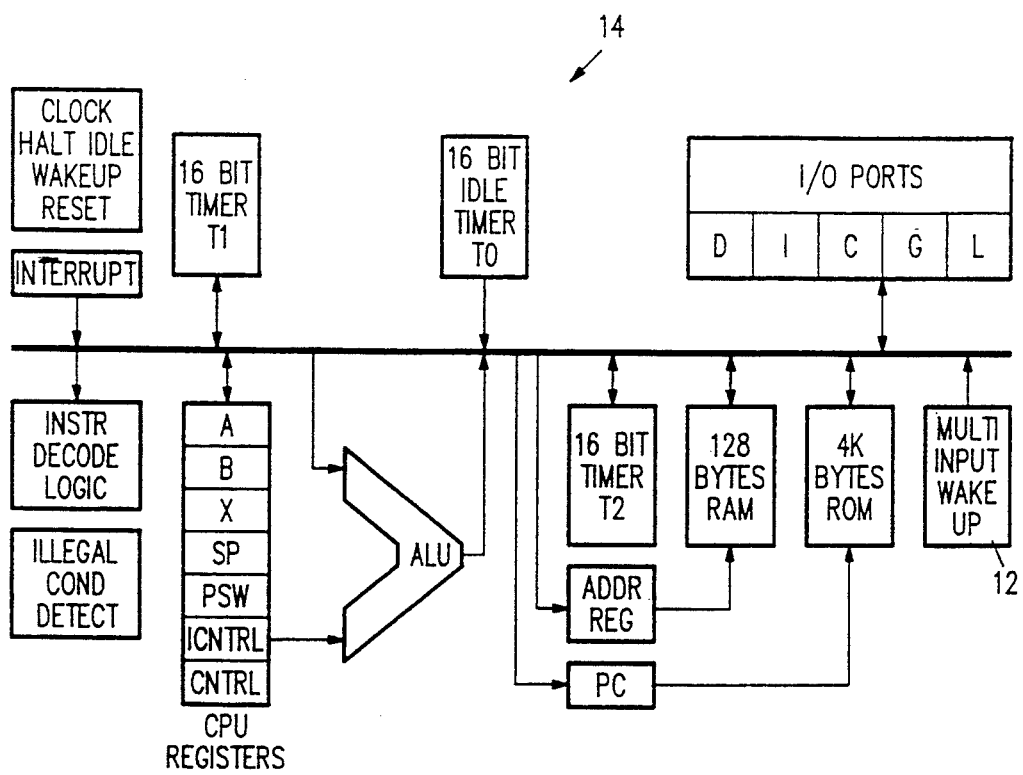
FIG. 4 is a block diagram illustrating a microcontroller architecture utilizable in an event driven wake-up system in accordance with the present invention.

FIG. 4 shows a block diagram of the architecture of microcontroller 14. With the exception of the multi-input wake-up logic 12 and its interrupt support, which are described in greater detail below, the microcontroller architecture is conventional. Thus, the following discussion focuses on the interface between the L port of the keyboard matrix 16 and the corresponding I/O L port of the microcontroller 14 and on the various configuration and interrupt features of microcontroller 14 that support the HALT mode and the event driven wake-up logic 12.

Figure 5:
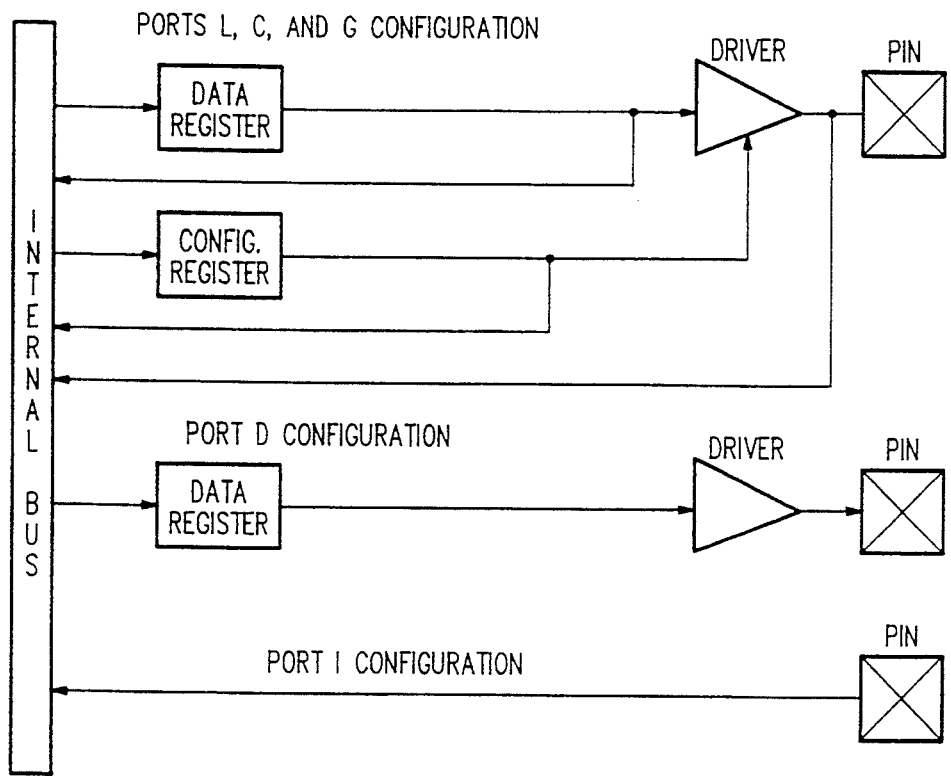
FIG. 5 is a schematic diagram illustrating the I/O port configuration of the microcontroller architecture shown in FIG. 4.

As shown in FIG. 5, there are two registers associated with the G port of the microcontroller 14, a data register and a configuration register. Therefore, each of the five I/O bits of the G port (G0, G2–G5) can be individually configured under software control as shown in the Table I.

TABLE I

| PORT G CONFIG | PORT G DATA | PORT G SETUP |
|---|---|---|
| 0 | 0 | Hi-Z (tri-state) |
| 0 | 1 | Input w/weak pull-up |
| 1 | 0 | Push-pull "0" output |
| 1 | 1 | Push-pull "1" output |

There are three data memory address location allocated for the G port; one each for the data register, the configuration register, and the input pins. Pin G6 of the G port is an input-only pin; pin G7 is either a dedicated clock output pin or a general-purpose input pin. The associated bits in the data and configuration registers for pins G6 and G7 may be used for special purpose functions.

As described in greater detail below, the microcontroller 14 is placed in the reduced current consumption HALT mode by writing a "1" to bit 7 of the port G data register. The microcontroller 14 is placed in an IDLE mode (described below) by writing a "1" to bit 6 of the port G data register.

Port L of microcontroller 14 is an 8-bit I/O port which also serves as the multi-input wake-up/interrupt source for exiting the low-power HALT or IDLE modes. Certain L port pins also serve the alternate function of timer interface control. All L-pins have Schmitt triggers on the inputs.

As shown in FIG. 5, there are two registers associated with the L port, a data register and a configuration register. Therefore, each L I/O bit can be individually configured under software control as shown in Table II.

TABLE II

| PORT L CONFIG | PORT L DATA | PORT L SETUP |
|---|---|---|
| 0 | 0 | Hi-Z input (tri-state) |
| 0 | 1 | Input w/weak pull-up |
| 1 | 0 | Push-pull "0" output |
| 1 | 1 | push-pull "1" output |

Three data memory address locations are allocated for the L port, one each for the data register, the configuration register and the input pins.

Port L provides multi-input wake-up in accordance with the present invention on all eight L port lines L0–L7.

Figure 6:
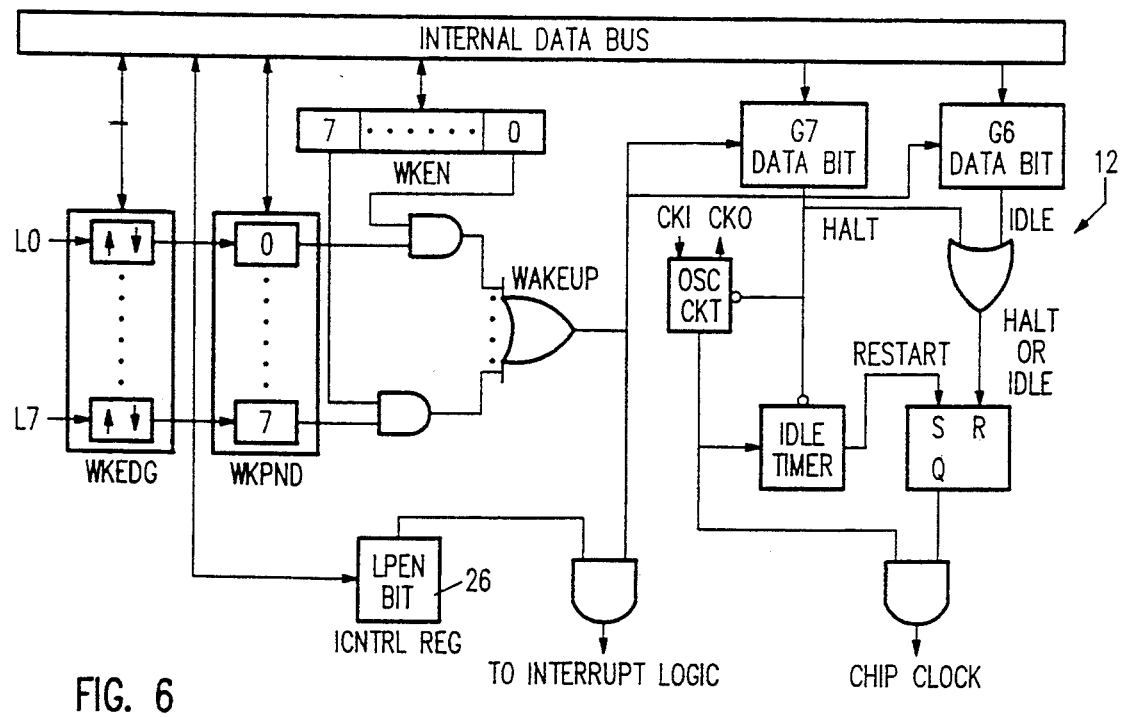
FIG. 6 is a logic diagram illustrating multi-input wake-up logic utilizable in the microcontroller architecture shown in FIG. 4.

Referring to FIG. 6, there are three registers (WKEN, WKPND, WKEDG) associated with the multi-input wake-up logic 12. The 8 bits in each of these registers correspond to each of the eight L-port lines L0–L7, which provide the source, i.e. the active signal KEY, for the multi-input wake-up registers. All three multi-input wake-up registers (WKEDG, WKEN, WKDND) are initialized low with RESET and are memory mapped in the data store memory address space.

The Wakeup Edge register (WKEDG) provides edge select control for each of the L-port pins.

The WKEN and WKPND registers are associated with the multi-input interrupt from the L port, with a selected edge on each of the L-port pins being available as an interrupt source.

As stated above, the microcontroller 14 provides two power-save modes of operation, HALT and IDLE.

In the HALT mode, all microcontroller activities, including the clock, are stopped, with the exception of clock monitor circuitry.

In the IDLE mode, only the on-board associated oscillator circuitry, the IDLE timer, and the clock monitor circuitry are active, with all other microcontroller activities are stopped.

With either the HALT or IDLE modes, all on-board RAM, registers, I/O states, and timers (except for the IDLE timer) are unaltered.

The microcontroller 14 does not enter either the HALT or IDLE mode if a multi-input wake-up signal is active (enabled and pending). Any set HALT or set IDLE instructions will act as NOPs when a multi-input wake-up is active. Consequently, a programmed multi-input wake-up can be activated to serve as a software HALT and IDLE inhibit. This programmed multi-input wake-up is activated by setting any associated pair of bits, one each in the WKEN and WKPND registers.

The microcontroller 14 supports two different method of exiting the HALT mode. The first method is by using the multi-input wake-up feature on the L-port. The second method is by pulling the RESET input low.

With the two-pin (CK1, CK0) closed-loop crystal oscillator mask option selected, the multi-input wake-up signal is not allowed to start the microcontroller 14 running immediately upon leaving the HALT mode, since crystal oscillators and resonators have a delayed startup time to reach full amplitude and frequency stability. The IDLE timer is used to generate a fixed delay to ensure that the oscillator has indeed stabilized before allowing instruction execution. In this case, upon detecting a valid wake-up signal, only the oscillator circuitry is enabled. The IDLE timer is enabled with a value of 256 and is clocked with the tc instruction cycle clock. The tc clock is derived by dividing the oscillator clock down by a factor of 10. The Schmitt trigger following the CKI inverter ensures that the IDLE timer is clocked only when the oscillator has a sufficiently large amplitude to meet the Schmitt trigger specifications. The Schmitt trigger is not part of the oscillator closed-loop. The termination of the 256-count start-up timeout from the IDLE timer enables the clock signals to be routed to the rest of the microcontroller 14.

With the single-pin R/C oscillator mask option selected, the 256-count IDLE counter start-up delay is optional, depending on the status of the CLKDLY flag. The clock delay is included only if the CLKDLY flag is found set with the single-pin R/C mask option. The CLKDLY flag is programmed as bit 7 of the G-port configuration register. This control register is initialized low with RESET, resulting in the CLKDLY flag being initially reset. Note that the clock delay is always included with the two-pin closed-loop crystal oscillator mask option selected, regardless of the state of the CLKDLY flag. Consequently, the CLKDLY flag may be used as an independent software flag when the crystal mask option has been selected.

As stated above, the multi-input wake-up logic 12 is used to return (wake-up) the microcontroller 14 from either the HALT or IDLE mode. This multi-input wake-up/interrupt feature may also be used to generate up to eight additional edge-selectable external interrupts.

The multi-input wake-up logic 12 for the microcontroller 14 is shown in detail in FIG. 6.

The wake-up enable register (WKEN) is used to select which particular L-port input (or combination of L-port inputs) will be used to exit the HALT or IDLE mode. Naturally, the L-port pins selected as wake-up pins with the WKEN register must be configured as L-port input pins. The three control registers WKEDG, WKEN and WKPND each contain an associated bit for each L-port pin. Setting a particular WKEN bit enables a wake-up from the associated L-port pin.

Whether the trigger condition on an L-port pin is to be a positive edge (low-to-high transition) or a negative edge (high-to-low transition) can be selected. This selection is made via the wake-up edge register (WKEDG), which is an 8-bit control register with a bit assigned to each L-port pin. Setting a control bit in WKEDG selects the trigger condition to be a negative edge on the associated L-port pin, while resetting the control bit selects a positive edge. Changing an edge select entails several steps in order to avoid a pseudo Wakeup/Interrupt condition as a result of the edge change. First, the associated WKEN bit should be reset, followed by the edge select change in WKEDG. Next, the associated WKPND bit should be cleared, followed by the associated WKEN bit being re-enabled.

For example, suppose the user wished to change the edge select from positive (low going high) to negative (high going low) for L port bit 5, where bit 5 has previously been enabled for an input interrupt. The program would be as follows:

| RBIT | 5,WKEN |
| SBIT | 5,WKEDG |
| RBIT | 5,WKPND |
| SBIT | 5,WKEN |

If the L-port bits have been used as outputs and then changed to inputs with multi-input wake-up, a safety procedure should also be followed to avoid inherited pseudo wake-up conditions. After the selected L-port bits have been reconfigured from output to inputs, but before the associated WKEN bits are enabled, the associated edge select bits in WKEDG should be set or reset for the desired selects, followed by the associated WKPND bits being cleared. This same procedure should be used following RESET, since the L-port inputs are left floating as a result of RESET.

As shown in FIG. 6, when the trigger condition for multi-input wake-up occurs, i.e. a depressed key or receipt of command data from the CPU 18, it is latched into the associated bit of the Wakeup Pending register (WKPND). The respective bits of the WKPND register are set on the occurrence of the selected trigger edges on the corresponding L-port pins. Since WKPND is a pending register for the occurrence of selected wake-up conditions, the microcontroller 14 does not enter the HALT or IDLE mode if any wake-up bit is both enabled and pending.

Port L provides eight additional, fully selectable, edge-sensitive interrupts (each with independent edge select), all of which are vectored into the same interrupt service routine.

The interrupts from port L share logic with the multi-input wake-up circuitry. The WKEN register allows interrupts from port L to be individually enabled or disabled. The WKEDG register allows the individual trigger conditions for the interrupts to be specified positive or negative. Finally, the WKPND register latches in the individual pending trigger conditions for the interrupts once the trigger conditions occur.

A control flag, LPEN, resident in the ICNTRL interrupt control register, serves as an overall interrupt enable for port L interrupts. Setting the LPEN flag enables port L interrupts and vice versa. Consequently, a port L interrupt can occur only if the associated enable and pending bits are set in the respective WKEN and WKPND registers, and both the LPEN and GIE global enable bits are set.

Since port L is also used for waking the microcontroller 14 out of the HALT or IDLE mode, the LPEN flag allows the user to exit the HALT or IDLE mode with or without the interrupt enabled. If the interrupt is disabled (LPEN flag reset), then the microcontroller 14 resumes program execution at the instruction immediately following the instruction that placed the microcontroller 14 in the HALT or IDLE mode. Alternatively, if the interrupt is enabled (LPEN and GIE flags both set), then the microcontroller 14 first vectors to the L-port interrupt service routine and then returns to the instruction immediately following the instruction (either a set HALT flag or set IDLE flag) that placed the microcontroller in the HALT or IDLE mode.

Figure 7:
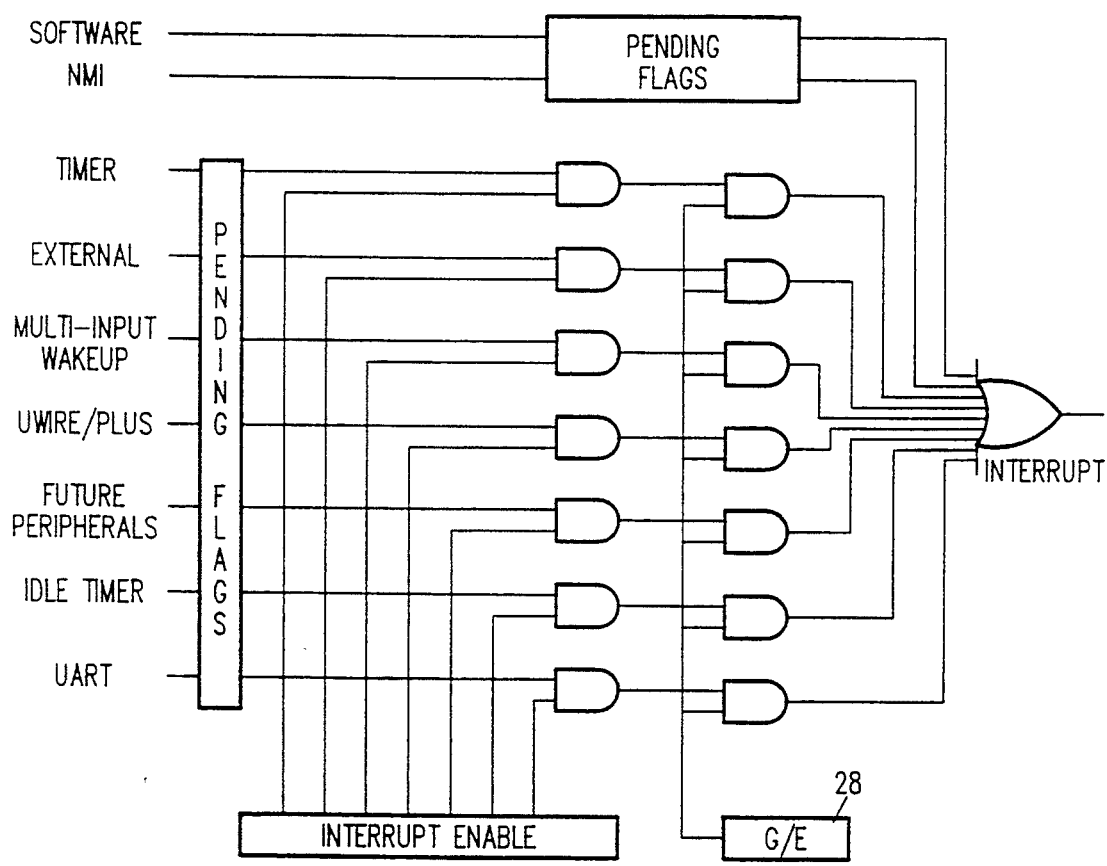
FIG. 7 is a logic diagram illustrating interrupt logic utilizable in the microcontroller architecture shown in FIG. 4.

As illustrated by the AND logic shown in FIGS. 6 and 7, an interrupt from a selected edge on a given L-port line requires both the Wakeup Interrupt Enable flag LPEN in the ICNTRL register 26 and the GIE (Global Interrupt Enable) bit 28 to be set, as well as having both the associated WKEN and WKPND flags set.

As shown in FIG. 7, each interrupt of microcontroller 14 has an associated pending flag, which is automatically set high when the interrupt occurs. The pending flag must be reset before the end of the associated interrupt service routine in order to prevent a second interrupt from the same condition. All interrupt pending flags are cleared with RESET.

Two instructions (INTR, VIS) are used to implement the microcontroller interrupt structure. The first instruction is INTR (opcode zero), which is jammed by hardware into the microcontroller's instruction register once the interrupt occurs. If this zero opcode INTR occurs as part of the instruction stream, then a non-maskable, high-priority software trap interrupt occurs. The second instruction is the VIS (Vector Interrupt Select). This instruction is programmed following any context switching and is used to select the vector (from a ROM vector table) of the highest arbitration ranking interrupt currently enabled and pending. The VIS instruction that uses arbitration logic to decide which interrupt source will be serviced first if two or more interrupts are enabled and pending.

The 32-byte interrupt vector ROM table is located at the top of a program memory block from address $_{xy}$E0 to $_{xy}$FF hexadecimal, where $_{xy}$ is the block number (usually 0) where the VIS instruction is located (each block of program memory contains 256 bytes). Should the VIS instruction be programmed at the top location of a block (such as address 00FF), the associate 32-byte vector table will reside at the top of the next higher block (locations 01E0 to 01FF with the VIS instruction at 00FF).

All microcontroller interrupts branch to program memory location 00FF hexadecimal once an interrupt is acknowledged. Consequently, any desired context switching (such as storing away the contents of the microcontroller's accumulator or B or X pointers) would normally be programmed starting at location 00FF, followed by the VIS instruction. The VIS instruction can be programmed at memory location 00FF if no context switching is desired.

Referring to FIG. 7, as stated above, the microcontroller maskable interrupts must be both globally and individually enabled. GIE is the Global Interrupt Enable bit and is resident in the microcontroller's PSW control register. For any maskable interrupt to be serviced, both the global and the local interrupt enable bits must be set.

Any pending and enabled interrupts are serviced after the current instruction being processed has finished execution. The one and only exception is a failed conditional/test instruction, where the interrupt service does not occur until the end of the skipped instruction.

As stated above, interrupt processing starts with jamming the INTR instruction into the instruction register after which the GIE (Global Interrupt Enable) bit in the PSW register is reset in order to disable all further maskable interrupts from causing a second interrupt. The current value of the Program Counter (PC) is pushed onto the stack, with the Stack Pointer (SP) being decremented by two. The program Counter (PC) is then loaded with the value 00FF hexadecimal. Thus, all interrupts branch to program memory location 00FF hexadecimal once an interrupt is acknowledged.

This procedure takes seven instruction (tc) clock cycles to execute. The program starting at memory location 00FF hexadecimal contains any desired context switching, such as saving the current values form the accumulator and the B and X pointers, followed by the VIS (Vector Interrupts Select) instruction.

A typical context switching program might be as follows:

|  | . = 00FF | ;SELECT INTERRUPT ADDRESS LOCATION |
|---|---|---|
| INTRPT: | PUSHA | ;PUSH ACCUMULATOR ONTO STACK |
|  | LD A,B |  |
|  | PUSHA | ;PUSH B POINTER ONTO STACK |
|  | LD A,X |  |
|  | PUSHA | ;PUSH X POINTER ONTO STACK |

Naturally, the reverse of the context switching must be performed at the end of the interrupt service routine in order to restore the context. A common routine (RESTOR) to provide the restoration necessary for the context switching shown would be as follows:

| RESTOR: | POP | A | ;POP X POINTER FROM STACK |
|---|---|---|---|
| | X | A,X | |
| | POP | A | ;POP B POINTER FROM STACK |
| | X | A,B | |
| | POP | A | ;POP ACCUMULATOR FROM STACK |
| | RETI | | |

This common routine terminates with the RETI (Return from Interrupt) instruction. Consequently, with the context switching shown, all maskable interrupt service routines would end with a jump to the RESTOR routine. This program code is shown as follows:

```
...
...
      JMP         RESTOR
```

Executing the RETI instruction at the end of the interrupt service routine causes the two bytes from the "top" of the stack to be popped into the Program Counter (PC) with the Stack Pointer (SP) being incremented by two. The RETI instruction also re-enables further maskable interrupts by setting the GIE (Global Interrupt Enable) bit in the PSW register. Maskable interrupts may be nested, if desired, by re-enabling (setting) the GIE bit in the middle of the interrupt service routine.

The VIS (Vector Interrupt Select) instruction, programmed at the end of the context switching, automatically selects the currently enabled interrupt pending with the highest arbitration ranking to be serviced. The VIS instruction arbitrates among the currently active interrupt sources and then loads the Program Counter (PC) with the contents of the vector location corresponding to the currently active interrupt with the highest ranking. Since the interrupt vectors each consist of two bytes, the interrupt service routines may be located anywhere in the program store memory. The sixteen interrupt vectors associated with the VIS instruction are packed in a 32-byte table, with the highest ranking at the top of the table (locations $_{xy}$FE and $_{xy}$FF). This 32-byte vector table must be located at the top of the block (256 bytes) in which the VIS instruction is programmed. The only exception is when the VIS instruction itself is resident at the top of a block (such as at 00FF with no context switching present). In this case, the vector table must be located at the top of the next higher block (location 01E0 to 01FF with the VIS at 00FF). Each of the 2-byte interrupt vectors occupies a pair of sequential program memory with the high-order byte of the vector in the lower address location and vice versa.

Each of the maskable interrupts has an associated enable bit and pending bit. These bits are all memory mapped and are found in the various control registers PSW, ICNTRL, T2CNTRL, etc. A maskable interrupt is active if both the associated enable and pending bits are set. When the interrupt condition occurs, the associated pending bit is automatically set regardless of the state of the associated enable bit or GIE bit. When setting a maskable interrupt enable bit, it should always be considered whether or not a previously pending occurrence of the interrupt is to be acknowledged. If previous occurrences are to be ignored any only new occurrences acknowledged, then the associated pending bit should be reset before the enable bit is set.

With an active maskable interrupt (both associated enable and pending bits set) and the global interrupt enable GIE bit set, the microcontroller is interrupted at the end of current instruction provided that the program is not in a non-maskable interrupt service routine. Again, the exception should be noted that if the current instruction is a failed conditional/test instruction, then the interrupt is delayed until the end of the skipped instruction (once again provided that the program is not in a non-maskable interrupt service routine).

As stated above, the interrupt process is accomplished with an INTR instruction (opcode 00) being jammed into the instruction register and replacing the opcode that is about to be executed. If a zero opcode occurs in the instruction register as part of the normal instruction stream, then a high-priority, non-maskable software trap interrupt occurs.

The following sequential steps are performed for every maskable interrupt:

1. The GIE (Global Interrupt Enable) bit is reset.
2. The address of the instruction about to be executed is pushed onto the stack.
3. The Program Counter (PC) branches to address 00FF.

At this time, since the GIE bit is reset, other maskable interrupts are inhibited from causing another interrupt. However, the occurrence of other maskable interrupt conditions during this time will still set their associated pending flags. The user is now free to perform any desired context switching by saving the context (A, B, X, PSW, etc.) of the microcontroller in the stack with PUSH instructions. The user then programs a Vector Interrupt Select (VIS) instruction in order to branch to the interrupt service routine of the interrupt with the highest arbitration ranking enabled and pending at the time of the VIS. Note that this is not necessarily the interrupt that caused the branch to address location 00FF hexadecimal prior to the context switching, since an interrupt with a higher arbitration ranking may have occurred during the context switching.

Thus, if an interrupt of a higher rank than the one which caused the interruption becomes active before the decision of which interrupt to service is made by the VIS, then the interrupt of the higher rank overrides any lower ones and is acknowledged. The lower priority interrupt(s) is still pending, however, and causes another interrupt immediately following the completion of the interrupt service routine associated with the higher priority interrupt just serviced. This lower priority interrupt occurs immediately following the RETI (Return from Interrupt) instruction at the end of the interrupt service routine just completed.

Inside the interrupt service routine, the associated pending bit has to be cleared by software. This is normally done at the start of the interrupt service routine in order to avoid missing a fast second occurrence of the same interrupt. The RETI (Return from Interrupt) instruction at the end of the interrupt service routine sets the GIE (Global Interrupt Enable) bit, allowing the microcontroller to be interrupted again if another interrupt is active and pending.

The VIS (Vector Interrupt Select) instruction looks at all active interrupts during its execution and performs an indirect jump to the beginning of the interrupt service routine of the interrupt with the highest priority. The addresses of the interrupt service routines, called vectors, are chosen by the user and stored in a ROM table starting at program memory address 01E0 (assuming that the VIS instruction is located between addresses 00FF and 01DF). The vectors are 15-bit wide and, therefore, occupy two ROM locations.

The vector of the maskable interrupt with the lowest rank is located at $_{xy}$E0 (high-order byte) and $_{xy}$E1 (low-order byte), etc., in increasing rank number. The vector of the maskable interrupt with the highest rank is located at $_{xy}$FA (high-order byte) and $_{xy}$FB (low-order byte). The vector of the NMI non-maskable interrupt is located at $_{xy}$FC (high-order byte) and $_{xy}$FD (low-order byte). The software trap the highest priority with its vector being located at $_{xy}$FE (high-order byte) and $_{xy}$FF (low-order byte).

If, by accident, a VIS instruction is executed without an interrupt being active, then the Program Counter (PC) branches to the vector of lowest priority (the default VIS vector) located at $_{xy}$E0–$_{xy}$E1. This default VIS vector can point to the Software Tap (ST) interrupt service routine or to another service routine as desired. The RETI instruction should not be used in exiting any default VIS service routine, since no associated return address will have been pushed onto the stack.

The VIS instruction and the 32-byte vector table must be located in the same 256-byte block ($_{xy}$00 to $_{xy}$FF) of program memory, with the vector table at the top of the block. The only exception is when the VIS instruction is located at the top address of the block ($_{xy}$FF), in which case the vector table must be located at the top of the next higher block.

The microcontroller 14 provides two non-maskable interrupts, the NMI (Non-Maskable Interrupt) and the ST (Software Trap). The ST has the high priority of these two non-maskable interrupts. The two non-maskable interrupts, ST and NMI, do not have enable bits (nor are they subject to the GIE Global Interrupt Enable bit), but each has an associated pending bit (STPND and NMIPND, respectively). These two pending bits are not memory mapped and, consequently, cannot be tested with the program. STPND and NMIPND are both cleared with RESET and conditionally cleared with the RPND (Reset Non-Maskable Interrupt Pending) instruction. The RPND instruction always resets the STPND flag, but resets the NMIPND flag only if the NMI interrupt has been acknowledged and the STPND flag is already reset. This conditional reset of the NMIPND flag is necessary, since the higher priority ST interrupt may occur within an NMI interrupt service routine. In this situation, the microcontroller could return to the NMI interrupt service routine after completing the ST interrupt service routine.

The ST has the highest priority among the interrupts. Consequently, nothing (except another ST) can interrupt an ST being serviced.

The NMI has the second highest priority among all interrupts. Consequently, nothing except an ST can interrupt an NMI being services. A second NMI, occurring while a first NMI is being serviced, does not interrupt the first NMI. Also, the second NMI is not latched. Consequently, a second NMI occurring while a first NMI is being serviced is lost. An NMI interrupt is edge-triggered.

Acknowledgement of non-maskable and maskable interrupts is similar, except that the GIE flag is not reset with non-maskable interrupt acknowledgement. Moreover, non-maskable interrupt service routines are not terminated with the RETI (Return from Interrupt) instruction as with the maskable interrupts. Consequently, the GIE Global Interrupt Enable flag is let unchanged with a non-maskable interrupt service routine. Non-maskable interrupts always interrupt a maskable interrupts service routine in progress; therefore, this preservation of the GIE flag status during a non-maskable interrupt is necessary if the interrupted maskable interrupt service is to be resumed once the non-maskable interrupt service is finished.

When a non-maskable interrupt occurs, indicated by either the STPND or NMIPND flags being set, any further maskable interrupt acknowledgement is inhibited. However, this does not prevent any further maskable interrupts from being latched into their associated pending flags for future usage.

It should be understood that various alternatives to the embodiment of the invention described herein may be utilized in practicing the invention. It is intended that the following claims define the scope of the invention and that methods and apparatus within the scope of these claims and their equivalents be covered thereby.

What is claimed is:

1. A microcontroller that executes a sequence of instructions in response to clock signals provided by a clock generator and that controls a data input device used to enter data into a data processing system, an address of a currently executing instruction in the sequence of instructions being stored in a program counter, the program counter being incremented during the execution of the currently executing instruction to indicate an address of the next instruction in the sequence of instructions, the microcontroller being operable in a plurality of current consumption modes which it cycles among in response to external events indicative of activity or indicative of an absence of activity of data entry to or data processing by the data processing system, the microcontroller operating in a normal current consumption mode during data entry to the data processing system, and the microcontroller being responsive to an external event by generating an active signal indicative of an occurrence of the external event, the microcontroller comprising:

(a) halt means for initiating a reduced current consumption mode, wherein said halt means responds to an event indicative of inactivity at the data input device by generating a halt signal, the microcontroller being responsive to the halt signal by deactivating the clock means and thereby suspending execution of the sequence of instructions and by entering a reduced current consumption mode; and (b) wake-up means for returning the microcontroller to the normal current consumption mode, wherein said wake-up means responds to an active signal generated by the data input device when the microcontroller has entered the reduced current consumption mode by generating a wake-up signal, the microcontroller being responsive to the wake-up signal by activating the clock generator and thereby resuming execution of the sequence of instructions, where the first instruction executed upon wake-up is an instruction the address of which is stored in the program counter as a result of the microcontroller executing the instruction which was last executed prior to entering the reduced current consumption mode, and by returning from the reduced current consumption mode to the normal current consumption mode.

2. A microcontroller as in claim 1 wherein the data input device is a keyboard with keys which can be depressed and the external event is the depression of a key on the keyboard.

3. A microcontroller as in claim 1 wherein the data input device is a keyboard and the external event is receipt of data from the data processing system.

4. An event driven wake-up system for controlling current consumption by a data processing system, the event driven wake-up system being operable in a plurality of current consumption modes which it cycles among in response to external events indicative of activity or indicative of an absence of activity of data entry to or data processing by the data processing system, the event driven wake-up system comprising:
 (a) a data input device that responds to an external event indicative of activity or inactivity of data entry to or data processing by the data processing system by generating an active signal indicative of an occurrence of the external event;
 (b) a microcontroller for controlling the data input device, the microcontroller executing a sequence of instructions in response to clock signals provided by a clock generator, an address of a currently executing instruction in the sequence of instructions being stored in a program counter, the program counter being incremented during the execution of the currently executing instruction to indicate an address of the next instruction in the sequence of instructions, the microcontroller being operable in a plurality of current consumption modes and cycling among the modes in response to the occurrence of the external event;
 (c) halt means for initiating a reduced current consumption mode, wherein said halt means responds to an event indicative of inactivity at the data input device by generating a halt signal, the microcontroller being responsive to the halt signal by deactivating the clock generator and thereby suspending execution of the sequence of instructions and by entering a reduced current consumption mode; and
 (d) wake-up means for returning the event driven wake-up system to the normal current consumption mode, wherein said wake-up means is responsive to an active signal provided by the data input device when the microcontroller means has entered the reduced current consumption mode, the wake-up means providing a wake-up signal that activates the clock generator and thereby causes the microcontroller to resume execution of the sequence of instructions, where the first instruction executed upon wake-up is an instruction the address of which is stored in the program counter as a result of the microcontroller executing the instruction which was last executed prior to entering the reduced current consumption mode, and returns the microcontroller from the reduced current consumption mode to the normal current consumption mode.

5. An event driven wake-up system as in claim 4 wherein the data input device is a keyboard with keys which can be depressed and the external event is the depression of a key on the keyboard.

6. An event driven wake-up system as in claim 4 wherein the data input device is a keyboard and the external event is receipt of data from the data processing system.

7. A data processing system comprising:
 (a) a central processing unit for processing data entered into the data processing system;
 (b) a data input device for entering data into the data processing system, the data input device being responsive to an external event by generating an active signal indicative of an occurrence of the external event;
 (c) a microcontroller that controls the data input device, the microcontroller executing a sequence of instructions in response to clock signals provided by a clock generator, an address of a currently executing instruction in the sequence of instructions being stored in a program counter, the program counter being incremented during the execution of the currently executing instruction to indicate an address of the next instruction in the sequence of instructions, the microcontroller being operable in a plurality of current consumption modes which it cycles among in response to external events indicative of activity or an absence of activity of data entry to the data processing system or data processing by the data processing system, with the microcontroller operating in a normal current consumption mode for data entry to the data processing system;
 (d) halt means for initiating a reduced current consumption mode, wherein said halt means responds to an event indicative of inactivity at the data input device by generating a halt signal, the microcontroller being responsive to the halt signal by deactivating the clock generator and thereby suspending execution of the sequence of instructions and by entering a reduced current consumption mode; and
 (e) wake-up means for returning the microcontroller to the normal current consumption mode, wherein said wake-up means responds to an active signal generated by the data input device when the microcontroller is in the reduced current consumption mode by generating a wake-up signal, the microcontroller being responsive to the wake-up signal by activating the clock generator and thereby resuming execution of the sequence of instructions, where the first instruction executed upon wake-up is an instruction the address of which is stored in the program counter as a result of the microcontroller executing the instruction which was last executed prior to entering the reduced current consumption mode, and by returning from the reduced current consumption mode to the normal current consumption mode.

8. A data processing system as in claim 7 wherein the data input device is a keyboard with keys which can be depressed and the external event is depression of a key on the keyboard.

9. A data processing system as in claim 7 wherein the data input device is a keyboard and the external event is receipt of data from the central processing unit.

* * * * *